Jan. 10, 1961 J. W. HUFF ET AL 2,967,563
METHOD OF MAKING MOLDED REINFORCED CORRUGATED HOSE
Filed Aug. 15, 1956 2 Sheets-Sheet 1
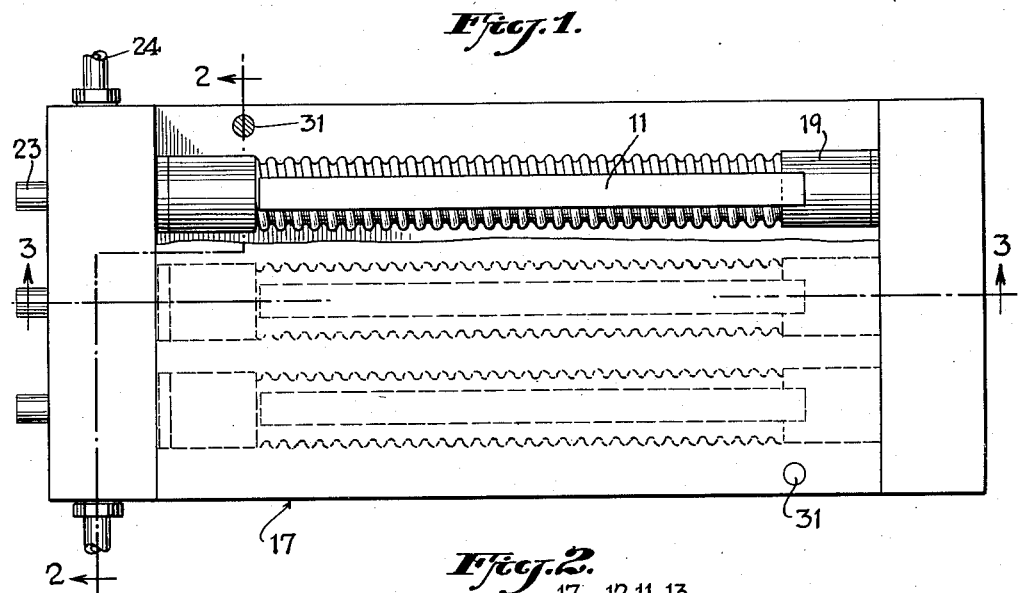
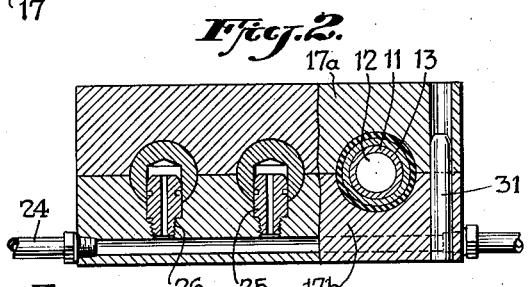
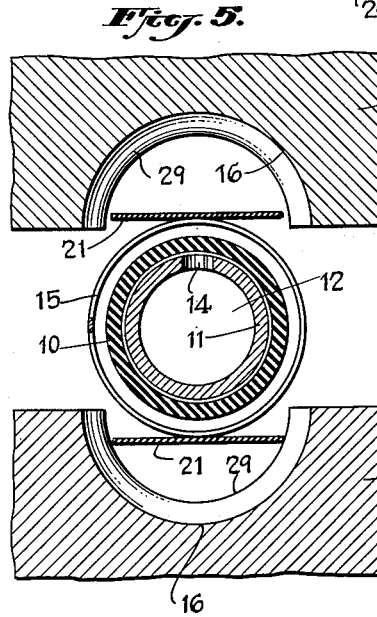
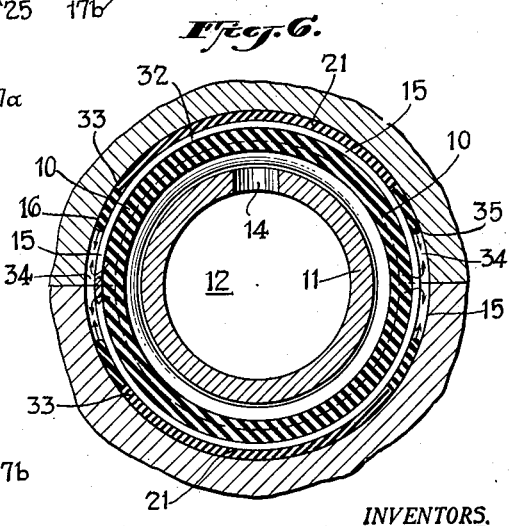
INVENTORS.
JAMES WILBUR HUFF,
JOSEPH H. BEDSON, JR
BY
ATTORNEYS.

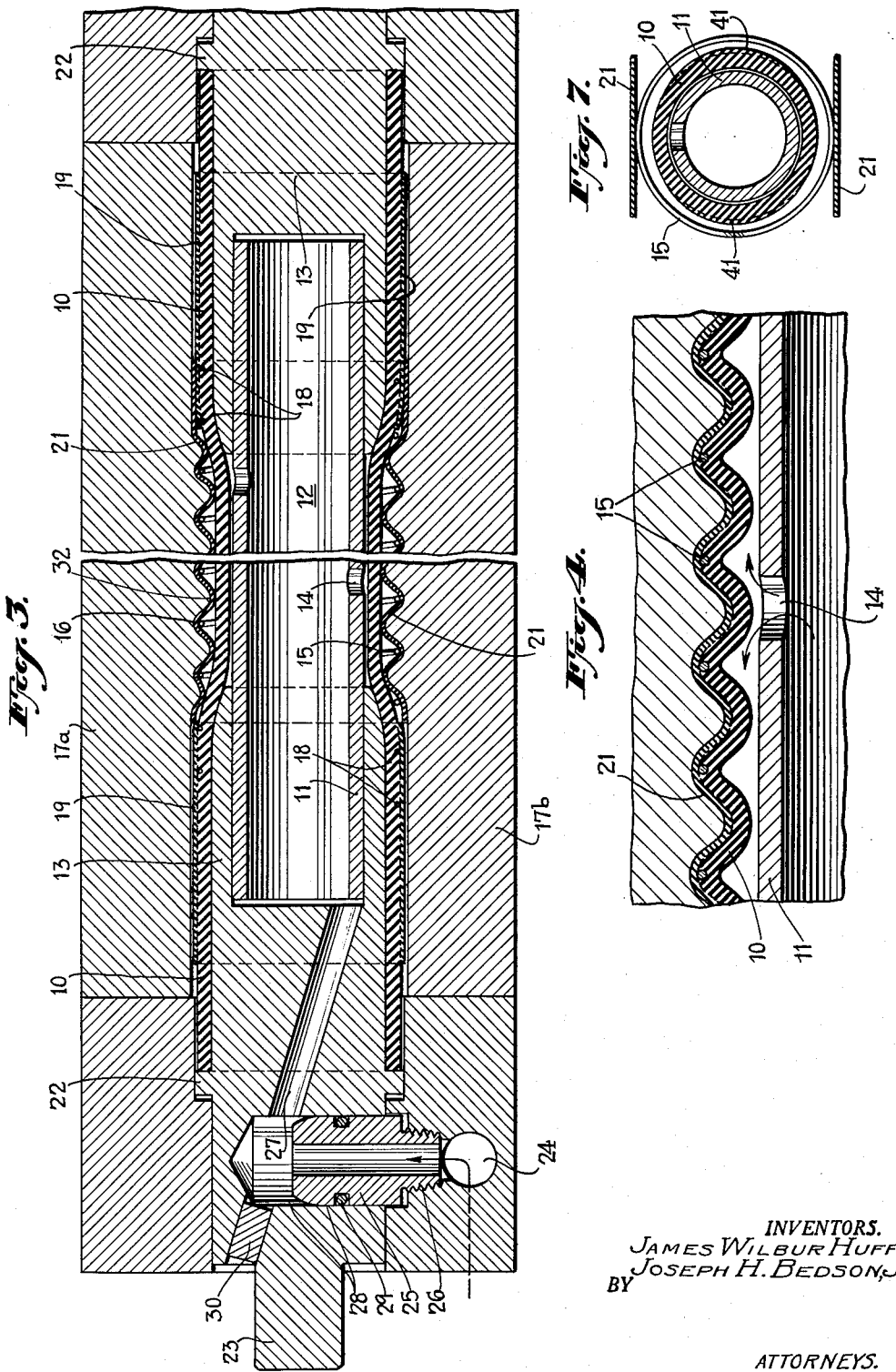

2,967,563

METHOD OF MAKING MOLDED REINFORCED CORRUGATED HOSE

James W. Huff and Joseph H. Bedson, Jr., Trenton, N.J., assignors to Thermoid Company, Trenton, N.J., a corporation of Delaware Filed Aug. 15, 1956, Ser. No. 604,273

7 Claims. (Cl. 154—8)

This invention relates to a method of making rubber or rubber-like corrugated tubing or hose. More particularly, it relates to an improved method of making a helically corrugated hose, which is reinforced by a helical coil spring member embedded in the corrugations of the wall.

Tubing to which the method of the present invention relates finds wide application, and is used to a great extent as automobile radiator hose. Rubber hose formerly employed in automotive cooling systems was susceptible to collapse particularly at sharp curves. In order to overcome this common failing, the tubular wall thickness was increased and a spring was positioned interior of the tube at the points in the system where collapse was likely to occur. Being unprotected, this spring was soon corroded by the cooling liquid and deteriorated and required replacement. More recently, radiator hose has been corrugated to improve its flexibility and afford somewhat greater resistance to collapse. Finally, a corrugated hose having an integral coiled wire or spring reinforcing member secured to or embedded within the wall of the hose was developed. This hose is both flexible and sturdy and by reason of the integral reinforcing spring is not subject to collapse, and with the spring either covered and secured to or embedded in the wall of the hose there is little, if any, likelihood of its corrosion.

Several complex methods have been suggested for manufacturing the corrugated hose with a covered integral reinforcing spring, but these either have been quite costly or have produced unsatisfactory products, or both. For example, in one form the helical wire coil was first covered with a rubber sheath and thereafter the rubber covered wire coil was placed within a cylindrical rubber blank to the interior of which the rubber covering of the wire was vulcanized, and the cylindrical blank was then corrugated. In another form it was endeavored to embed a helical wire coil in a molded corrugated hose, but great difficulty was experienced in both maintaining the wire helix centered longitudinally in register with the corrugations and in holding the helical wire in radial spaced relationship with the grooves in the mold, such as to permit the rubber to flow around adequately cover the wire. Consequently, in the finished hose the spring is barely beneath the surface of the peak of the corrugations and in many instances it is clearly visible upon casual inspection of the tube. The spring thus positioned is definitely not provided with an adequate thickness of rubber to prevent corrosion thereof from without. Furthermore, examinations of commercially available tubes of this type indicate that the coils of the spring are not uniformly disposed within the corrugation peaks, i.e., some coils are centered on the peak axis, while others are adjacent the sides of the peaks.

An object of this invention is to provide a method for efficiently and economically molding a readily flexible corrugated hose with a reinforcing helical metallic wire embedded in the peaks of the corrugated wall and adequately protected from corrosion from within or without the hose.

Another object is to provide a method for holding the wire helix in register with the corrugated mold cavity and spaced radially from the cavity wall at the peaks of the mold.

The present invention is more fully described below with reference to the accompanying drawings, wherein, Fig. 1 is a plan view of a mold having three cavities forming the corrugated hose with a portion thereof cut away to illustrate a hose in position in one of said cavities;

Fig. 2 is a vertical section taken on the line 2—2 of Fig. 1;

Fig. 3 is an interrupted sectional view taken on the line 3—3 of Fig. 1 illustrating the upper and lower portions of the closed mold, the mandrel therein with blank assembly thereon, before the application of pressure to the interior of the mandrel;

Fig. 4 is a partial section similar to Fig. 3, but with pressure applied to the interior of the mandrel;

Fig. 5 is a transverse section of the blank assembly illustrating also fragmentary sections of the upper and lower portions of the mold prior to closing;

Fig. 6 is a transverse section through the assembly with the mold closed, illustrating the flow of blank material around the spring; and Fig. 7 is a transverse section similar to Fig. 5, but illustrating the cross-sectional configuration of the blank employed in another embodiment of the present invention.

Referring first to Figs. 3 and 5, the method of this invention includes placing a generally cylindrical tubular blank of incompletely cured elastomeric material such as rubber or rubber-like material 10 on a hollow mandrel 11 of outside diameter somewhat smaller than that of the inside diameter of blank 10, and having end portions 13 of diameter approximately equal to the inside diameter of the finished tube. The wall of mandrel 11 is provided with a plurality of holes 14 circumferentially and longitudinally about its periphery through which pressure may be applied from the hollow 12 to the interior of blank 10. The portion of the blank 10, intermediate its ends, which is to be corrugated is then surrounded with a helically coiled wire spring 15, preferably of spring steel, with the coil so disposed that the individual coils will be in register with the valleys 16 of the cavity provided in a mold 17 comprising mold sections 17a and 17b. The ends such as 18 of the helical spring coil are secured over the exterior end portions of the blank 10 above the enlarged ends 13 of the mandrel preferably by transversely wrapping these ends with a piece of heavy bias-cut fabric 19. Alternatively, end coils 18 may be wrapped with pressure sensitive tape compatible with the blank material. Generally, fabric material or a fabric adhesive will be preferred, since it affords a measure of reinforcement to the ends of the finished tube.

Prior to closing the mold 17 over the blank and spring assembly, two thin longitudinal strips, such as 21, of rubber or rubber-like material similar to that of blank 10 are disposed on diametrically opposite sides of the coil 15, one on the upper portion and the other on the lower portion opposite the mold sections 17a and 17b respectively. These strips 21 are of length sufficient to at least extend longitudinally over the coil corresponding to that portion of the blank to be corrugated. As illustrated in Fig. 5, when two strips are employed, the width of strips 21 is somewhat less than half the circumference of blank 10 or of a coil of spring 15. The two strips are so arranged that the circumferential distances between adjacent longitudinal edges of the strips are preferably substantially equal. As clearly shown in Fig. 5 the mold sections 17a and 17b each comprise one half of the mold cavity and the strips 21 are each in register with the one half cavity of a corresponding mold section; and the strips 21 are each of a width less than the inside diameter of said mold cavity taken at the peaks of its ridges. By this arrangement the ridges in each half mold cavity may pass in the corresponding spaces between the individual coils of the helical wire when the mold sections are closed together without pinching the strip material 21 between the mold sections.

The mandrel 11 with the blank, spring and strip assembly thereon is then placed into the cavity of lower mold portion 17b. As illustrated in Fig. 3, mandrel 11 is keyed or flanged as at 22 for engagement with complementary recesses in the mold. A trunnion 23 projects from at least one end of the mandrel through recessed ends of the mold for easy handling of the mandrel and its assembly. Referring also to Figs. 1 and 2, it will be seen that the lower portion 17b of the mold is transversely drilled to receive a pressure line 24, which communicates through projecting nipple 25, threadably mounted as at 26 in the lower portion of the mold, and drilled channel 27 in the mandrel with the interior portion 12 of the mandrel. The mandrel is reamed as at 28 for a tight fit about nipple 25 and its sealing ring 29. Plug 30 seals the drill hole for channel 27. When the mandrel is properly positioned in lower mold portion 17b, the upper or cover portion 17a is placed thereon, positioned by means of dowel pins 31, and secured against displacement.

Before the application of pressure to line 24, the blank, spring and strip assembly within the mold assumes the aspect illustrated in Fig. 3 with strips 21 conforming to the peaks 32 and valleys 16 of the mold cavity. It will be seen from this that the strips 21 serve to maintain the helical wire coil 15 in proper longitudinal register with the helical mold cavity and additionally to hold the wire spaced radially inwardly from the wall of the mold cavity. The mold is now suitably heated to a temperature sufficient to mold and cure the material of the tubular blank and strips. While the mold is being heated, pressure is applied to line 24, which causes the blank 10 to expand, as illustrated in Fig. 4, and conform to the mold cavities.

Referring also to Fig. 6, it will be observed that when pressure is applied and the blank expanded, strips 21 serve to space the coils of spring 15 from the valleys 16 of the mold, not only immediately beneath the strips, but also in the area between the adjacent longitudinal edges 33 of the strips, thus providing a circumferential space 34 between spring 15 and valleys 16. Under the influence of heat and pressure the strips 21 are bonded to blank 10, and the material of the blank and strips flows in the directions indicated by the arrows in Fig. 6 into space 34, covering spring 15 as at 35. Thus there is provided a coating of rubber or rubber-like material for the spring not only immediately under the strips 21, but also intermediate the edges of such strips. Following curing, the time of which depends upon the particular material of the blank, pressure is released, the mold opened, the mandrel withdrawn and the now corrugated, reinforced tube stripped from the mandrel.

By way of example, we have found it entirely satisfactory for standard radiator hose having uncorrugated ends with an inside diameter of about 1⅞₁₆″, to use as the blank 10 a cylindrical blank extrusion of uncured or semi-cured rubber having an outside diameter of 1¹⁵⁄₃₂″ and a wall thickness of 0.175″. This blank was placed on the mandrel 11 and the portion of the blank to be corrugated was then enclosed with a helical spring 15 having an outside helix diameter of 1¾″ and a wire diameter of 0.047″. As is customary in the art it is preferable to use a suitable bonding coating on the wire helix to facilitate bonding. For example, we first dip the wire coil in thermo-setting resin and thereafter in synthetic rubber, the result being a coating having an aggregate thickness of the order of 0.001″. The pitch of the helical spring was adjusted so that there are approximately 2¼ coils per inch, and the end two or three coils such as 18 of the spring were secured to the tubular blank 10 near its ends by wrapping with a piece 19 of cotton duck bias cut about 2″ wide by about 6″ long. Longitudinal strips such as 21, each 1½″ wide by about 0.03″ thick were disposed in the manner above described, and the mold closed. The assembly was then placed in a heated press which served to hold the mold in closed condition and maintain the same at the desired molding and curing temperature. The expanding pressure molding was effected by steam introduced into the hollow mandrel 10 at a pressure of about 100 p.s.i. Heat and pressure were maintained for approximately 20 minutes to complete curing, after which the mold was cooled, opened and the finished hose removed from the mandrel. A careful inspection of the exterior of the hose failed to reveal any exposed portions of the spring. Longitudinal sections of said hose showed that the reinforcing spring was fully embedded within the corrugated wall adjacent the peaks thereof throughout the length and circumference of the hose.

In view of the fact that more rubber stock is provided in zones corresponding to the areas of strips 21, by the combined thickness of such strips and the tubular wall 10, these corresponding wall segments of the finished hose are somewhat thicker than the intermediate segments where only the single thickness of the tube 10 is present. While this single thickness furnishes sufficient stock to flow over the wire, the corrugated wall is not of uniform thickness circumferentially. While this is entirely satisfactory, a modification is described below which provides a more uniform wall thickness where desired.

When it is desired to produce a reinforced corrugated tube wherein the corrugated wall is of uniform thickness throughout its circumference and a somewhat thicker covering of rubber is provided on the exterior of the helical wire in the zone corresponding to the space between the strips 21, this may be accomplished with a modification of the tubular blank. In this modification, the present invention includes the use of a tubular blank extrusion of unsymmetrical wall thickness circumferentially, i.e., of normal wall thickness beneath the strips, and of increased wall thickness beneath the spaces intermediate adjacent longitudinal edges of the strips. The larger volume of the blank intermediate the strips facilitates flow of the blank material into the aforementioned spaces. This embodiment of the present invention is clearly illustrated in Fig. 7, where it will be observed that blank 10 has an increased wall thickness as at 41 on opposite sides, so that in transverse section the outside of the blank is generally elliptical, while the inside is normally circular. In this modification, strips 21 of a thickness approximately equal to the increased thickness of the blank at 41 are superimposed upon the blank and spring normal to the areas of increased thickness as indicated in the drawing.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended hereto.

What I claim is:

1. A method of making a reinforced corrugated tube of elastomeric material, comprising the steps of providing a tubular blank of incompletely cured elastomeric material, surrounding said blank with a helically coiled metal wire the coils of which are in substantially uniform spaced apart relationship intermediate the ends of said tubular blank, placing a pair of strips of similar elastomeric material longitudinally along the exterior of said coiled wire with the longitudinal edges of adjacent strips in spaced relation about the circumference of said wire, surrounding the thus formed assembly with a mold having a helical cavity, said mold comprising an upper section and a lower section each providing one-half of the mold cavity, each of said strips being in register with a corresponding half mold cavity and having a width less than the inside diameter of said mold cavity taken at the peaks of its ridges, heating said mold, expanding said blank and superimposed strips into the recesses of said mold, and continuing said heating and expansion for a time sufficient to cure said elastomeric material, whereby said blank is bonded to said strips and the elastomeric material flows into the spaces intermediate adjacent strips and surrounds portions of the coil therein.

2. A method of making an elastomeric tube having helical corrugations containing a helical metallic reinforcing member and provided with cylindrically contoured ends, said member being disposed in the corrugated wall of the tube adjacent the peaks of said corrugations, comprising the steps of providing a tubular blank of elastomeric material, positioning a helically coiled wire about said blank intermediate its end portions, superimposing upon said wire coil a pair of longitudinal strips of similar elastomeric material, thereby enclosing a portion of the circumference of said coil, with the longitudinal edges of adjacent strips in spaced relationship about the circumference of said wire coil, enclosing the thus formed assembly in a mold having a helical cavity with the valleys thereof corresponding to the coils of said wire, said mold comprising an upper section and a lower section each providing one-half of the mold cavity, each of said strips being in register with a corresponding half mold cavity and having a width less than the inside diameter of said mold cavity taken at the peaks of its ridges heating the mold and simultaneously applying positive pressure to the interior of said blank, whereby said strips are caused to conform to the contour of said mold thereby maintaining said coiled wire in spaced relation from said mold, and continuing said heating and positive pressure for a time sufficient to cure said elastomeric material, whereby said blank is bonded to said strips and the elastomeric material flows into the spaces intermediate adjacent strips and surrounds portions of the wire coil therein.

3. A method of making a helically corrugated tube of elastomeric material having a metal wire reinforcing member disposed beneath the surface of the peaks of the corrugations of said helically corrugated tubes, which comprises providing a tubular blank of elastomeric material, surrounding the portion of said blank to be corrugated with a helically coiled wire spring, securing the ends of said spring to said blank against lateral displacement therefrom, superimposing upon said spring a pair of oppositely disposed longitudinal strips of similar elastomeric material of length at least equivalent to the portion of said blank to be corrugated and of width equal to less than half the circumference of said tubular blank, said strips being positioned so that the circumferential distances between adjacent longitudinal edges of the strips are substantially equal, enclosing the thus formed tubular assembly in a tubular mold having a helical cavity, said mold comprising an upper section and a lower section each providing one-half of the mold cavity, each of said strips being in register with a corresponding half mold cavity and having a width less than the inside diameter of said mold cavity taken at the peaks of its ridges. heating said mold and simultaneously applying positive pressure to the interior of said blank, whereby said strips are caused to conform to the contour of said mold thereby maintaining said spring beneath said strips and intermediate the adjacent longitudinal edges thereof in spaced relation from the interior of said mold, and continuing said heating and positive pressure for a time sufficient to cure said elastomeric material.

4. A method of making a molded, helically corrugated tube of elastomeric material internally reinforced with a metal helical wire coil reinforcing member disposed within the peaks of the corrugations of said helically corrugated tube entirely below the upper surface of said peaks, which comprises the steps of providing a generally cylindrical tubular blank of incompletely cured elastomeric material having a diameter less than the inner diameter of the corrugated tube to be molded, surrounding the portion of said blank to be corrugated, with a helically coiled metal spring of an interior coil diameter greater than the diameter of said tubular blank, securing the ends of said spring to said blank adjacent the ends thereof, superimposing upon said spring a pair of diametrically oppositely disposed longitudinally extending strips of similar elastomeric material and positioning said strips so that the circumferential distances between adjacent longitudinal edges thereof are substantially equal, enclosing the thus formed tubular assembly in a mold having a helical cavity, said mold comprising an upper section and a lower section each providing one-half of the mold cavity, each of said strips being in register with a corresponding half mold cavity and having a width less than the inside diameter of said mold cavity taken at the peaks of its ridges, heating said mold and simultaneously applying positive pressure to the interior of said blank whereby said strips are caused to conform to the contour of said mold thereby maintaining said spring beneath said strips and intermediate adjacent the longitudinal edges thereof in spaced relationship from the interior of said mold, and continuing said heating and pressure for a time sufficient to cure said elastomeric material, whereby said blank is bonded to said strips and the material of said blank and strips flows into the spaces intermediate adjacent strips and surrounds portions of the coil therein.

5. A method of making a cylindrical molded tube of elastomeric material having helical corrugations intermediate its ends, said corrugated portion being internally reinforced by a metal spring member disposed within the peaks of said corrugations a substantially uniform distance below the upper surface of said peaks, which comprises the steps of providing a generally cylindrical tubular blank of incompletely cured elastomeric material having an unsymmetrical cross-sectional wall thickness, said blank having a wall thickness greater in diametrically opposite segments and a lesser wall thickness in the intermediate segments, surrounding the portion of said blank to be corrugated with a helically coiled metal spring, securing the ends of said spring to said blank adjacent the ends thereof, superimposing upon opposite sides of said spring and adjacent the areas of lesser wall thickness of said blank longitudinal strips of similar elastomeric material of a thickness substantially equal to the difference in wall thicknesses of said blank, positioning said strips so that the circumferential distance between adjacent longitudinal edges thereof is no greater than the circumferential extent of the thin wall segments of said tubular blank, enclosing the formed tubular blank assembly in a mold comprising an upper section and a lower section jointly providing a helical cavity, each of said strips being in register with a corresponding half mold cavity and having a width less than the inside diameter of said mold cavity taken at the peaks of its ridges, heating said mold and simultaneously applying positive pressure to the interior of said blank whereby said strips are caused to conform to the contour of said mold thereby maintaining said spring beneath said strips and intermediate adjacent longitudinal edges thereof in spaced relation from the interior of said mold and continuing said heating and positive pressure for a time sufficient to cure said elastomeric material whereby said blank is bonded to said strips and the elastomeric material flows into the spaces intermediate adjacent strips and surrounds the portions of the spring therein.

6. In a method of making an elastomeric tube having helical corrugations with a metal wire reinforcing member disposed therein, including the steps of providing a tubular blank of incompletely cured elastomeric material, enclosing the portions of said tube to be corrugated with a helically coiled metal spring, adjusting the pitch of said spring to conform to the peaks of said corrugations, securing the ends of said spring to said blank adjacent the ends thereof, enclosing the thus formed assembly in a mold having a helical cavity conforming to the corrugated tube to be molded, heating said mold and simultaneously applying pressure to the interior of said blank whereby said blank is expanded into the cavity of said mold and said elastomeric material conforms to the mold cavity, and continuing said heating and pressure for a time sufficient to cure said elastomeric material, the improvements comprising superimposing upon said spring in position on said blank a pair of diametrically oppositely disposed longitudinal strips of similar elastomeric material, said strips being spaced about the circumference of said spring said strips spacing said spring from the interior surface of said mold when said assembly is placed in said mold and expanded thereby facilitating flow of the elastomeric material about the spring and providing a substantially uniform coating of elastomeric material for said spring.

7. In a method of making an elastomeric tube having helical corrugations with a metal wire reinforcing member disposed therein including the steps of providing a tubular blank of incompletely cured elastomeric material, enclosing the portions of said tube to be corrugated with a helically coiled metal spring, adjusting the pitch of said spring to conform to the peaks of said corrugations, securing the ends of said spring to said blank adjacent the ends thereof, enclosing the thus formed assembly in a mold having a helical cavity conforming to said corrugations, heating said mold and simultaneously applying pressure to the interior of said blank whereby said blank expands into the concavity of said mold and said elastomeric material flows in the direction of said spring, and continuing said heating and pressure for a time sufficient to cure said elastomeric material, the improvement which comprises superimposing upon said spring a pair of circumferentially spaced longitudinal strips of similar elastomer material, said strips maintaining said spring in longitudinal register with the helical mold cavity and in radial spaced relationship from the interior wall of the valley of the corrugated mold cavity thereby providing a space for the elastomeric material to flow outwardly of said spring and surround the same.

References Cited in the file of this patent

UNITED STATES PATENTS

| | | |
|---|---|---|
| 2,267,530 | Maclachlan | Dec. 23, 1941 |
| 2,396,059 | Roberts | Mar. 5, 1946 |
| 2,612,910 | Krupp | Oct. 7, 1952 |
| 2,713,885 | McKinley | July 26, 1955 |
| 2,780,273 | Roberts | Feb. 5, 1957 |
| 2,780,274 | Roberts et al. | Feb. 5, 1957 |
| 2,813,573 | Roberts | Nov. 19, 1957 |

UNITED STATES PATENT OFFICE
CERTIFICATION OF CORRECTION

Patent No. 2,967,563                      January 10, 1961

James W. Huff et al.

It is hereby certified that error appears in the above numbered patent requiring correction and that the said Letters Patent should read as corrected below.

Column 1, line 56, after "around" insert -- and --;
column 2, line 9, after "cavities" insert -- for --;
column 8, line 13, for "elastomer" read -- elastomeric --.

Signed and sealed this 20th day of June 1961.

(SEAL)
Attest:

ERNEST W. SWIDER
Attesting Officer

DAVID L. LADD
Commissioner of Patents